US008213960B2

(12) United States Patent
Lin

(10) Patent No.: US 8,213,960 B2
(45) Date of Patent: Jul. 3, 2012

(54) METHOD FOR POSITIONING FEMTO BASE STATION THROUGH SUPL PLATFORM AND SYSTEM THEREOF

(75) Inventor: Wei-Sen Lin, Taipei County (TW)

(73) Assignee: Askey Computer Corporation, Taipei (TW)

( * ) Notice: Subject to any disclaimer, the term of this patent is extended or adjusted under 35 U.S.C. 154(b) by 93 days.

(21) Appl. No.: 12/966,283

(22) Filed: Dec. 13, 2010

(65) Prior Publication Data

US 2012/0115502 A1 May 10, 2012

(30) Foreign Application Priority Data

Nov. 4, 2010 (TW) .............................. 99137901 A

(51) Int. Cl.
*H04Q 7/20* (2006.01)

(52) U.S. Cl. ................ 455/456.1; 342/357.09; 342/386; 455/456; 455/456.5; 455/435.1

(58) Field of Classification Search .................. 455/456, 455/456.1, 456.5; 342/435.1
See application file for complete search history.

(56) References Cited

U.S. PATENT DOCUMENTS

| 6,249,245 | B1 * | 6/2001 | Watters et al. ............. 342/357.4 |
| 7,577,443 | B1 * | 8/2009 | Moll et al. ................. 455/456.1 |
| 8,072,381 | B1 * | 12/2011 | Ziegler ........................... 342/386 |
| 8,089,400 | B1 * | 1/2012 | Fang et al. ............... 342/357.42 |
| 2002/0102992 | A1 * | 8/2002 | Koorapaty et al. ........... 455/456 |
| 2003/0008669 | A1 * | 1/2003 | Stein et al. ..................... 455/456 |
| 2004/0008138 | A1 * | 1/2004 | Hockley et al. .......... 342/357.09 |
| 2004/0203853 | A1 * | 10/2004 | Sheynblat .................. 455/456.1 |
| 2007/0121560 | A1 * | 5/2007 | Edge .............................. 370/338 |
| 2008/0227465 | A1 * | 9/2008 | Wachter et al. ............ 455/456.1 |
| 2008/0299992 | A1 * | 12/2008 | Eitan et al. ................. 455/456.5 |
| 2009/0180439 | A1 * | 7/2009 | Tabery et al. ................. 370/331 |
| 2009/0264137 | A1 * | 10/2009 | Soliman ..................... 455/456.1 |
| 2009/0311987 | A1 * | 12/2009 | Edge et al. ................. 455/404.1 |
| 2010/0056184 | A1 * | 3/2010 | Vakil et al. ................. 455/456.5 |
| 2010/0120447 | A1 * | 5/2010 | Anderson et al. .......... 455/456.1 |
| 2010/0298008 | A1 * | 11/2010 | Burroughs ................. 455/456.1 |
| 2010/0309790 | A1 * | 12/2010 | Polakos ....................... 370/241 |
| 2011/0013528 | A1 * | 1/2011 | Chen ............................ 370/252 |
| 2011/0059751 | A1 * | 3/2011 | Zhang et al. ............... 455/456.1 |
| 2011/0249623 | A1 * | 10/2011 | Wachter et al. ............... 370/328 |
| 2011/0294506 | A1 * | 12/2011 | Claussen et al. ........... 455/435.1 |
| 2012/0088518 | A1 * | 4/2012 | Edge .......................... 455/456.1 |

* cited by examiner

*Primary Examiner* — Charles Shedrick

(57) ABSTRACT

A method for positioning a femtocell base station through a SUPL platform includes the steps of: initiating a SUPL program in the femtocell base station to establish communication between the femtocell base station and the SUPL platform so as to obtain assistant positioning information and approximate location information of the femtocell base station through the SUPL platform; the femtocell base station capturing related satellite signals according to the assistant positioning information, and if the captured related satellite signals are sufficient for positioning calculation, performing the positioning calculation to obtain precise location information of the femtocell base station and replacing the approximate location information with the precise location information. The location information obtained by positioning will be provided by the femtocell base station to a core network for registration or broadcast by the femtocell base station within its coverage.

10 Claims, 2 Drawing Sheets

METHOD FOR POSITIONING FEMTO BASE STATION THROUGH SUPL PLATFORM AND SYSTEM THEREOF

BACKGROUND OF THE INVENTION

1. Field of the Invention

This application claims priority to Taiwanese Application No. 99137901, filed on Nov. 4, 2010, which is incorporated by reference in its entirety.

The present invention relates to positioning techniques in the field of wireless communication, and, more particularly, to a method and system that use a SUPL platform and a network system supporting the SUPL platform to position a femtocell base station such as a femtocell base station.

2. Description of Related Art

In the development of network communications, network coverage has long been a focus of concern for Internet service providers and an important factor considered by users when choosing Internet service providers. Currently, the coverage of wide area networks is quite stable. For example, the coverage of macrocell base stations can reach sparsely populated regions and fast moving users and even remote villages. But in the buildings of densely populated cities, the macrocell coverage can be quite poor. Accordingly, femtocell base stations have been developed to extend the coverage of mobile networks so as to overcome the above-described drawback of poor indoor coverage.

Similar to a macrocell base station, a femtocell base station in operation needs to provide its geographical location information to a core network for registration so as to facilitate management of mobile network deployment, and further needs to continuously broadcast its geographical location information within its coverage such that, when a mobile communication terminal such as a mobile phone enters into the coverage of the femtocell base station, it can receive the geographical location information so as to establish a wireless network connection for wireless communication. Therefore, to enable the femtocell base station to provide communication services, a positioning process needs to be performed.

Currently, the positioning of femtocell base stations depends on conventional global navigation satellite system (GNSS) chips/receivers. For example, a femtocell base station has a GNSS chip/receiver disposed therein for calculating positioning data (for example, differential correction data, satellite running state, etc.) so as to capture GNSS signals for positioning. However, such a positioning method is often limited by the GNSS chip/receiver sensitivity and signal strength, thereby resulting in the problem that it takes a long time for a first time positioning or positioning cannot be performed. Alternatively, a femtocell base station can have an assisted global navigation satellite system (A-GNSS) chip/receiver disposed therein for receiving assistant positioning information from an A-GNSS server through Internet connection so as to quickly capture signals Such a positioning method shortens the time for a first time positioning, but positioning still cannot be performed in an environment where GNSS signals are weak, for example, when the GNSS signals are blocked by clouds or buildings.

SUMMARY OF THE INVENTION

Accordingly, the present invention provides a method and system for positioning a femtocell base station through a secure user plane location (SUPL) platform so as to overcome the conventional problems wherein it takes a long time for a first time positioning of a femtocell base station to be established or positioning of a femtocell base station cannot be performed due to weak received signals In order to achieve the above and other objects, the present invention provides a method for positioning a femtocell base station through a SUPL platform and a network system supporting the SUPL platform so as to obtain location information of the femtocell base station, thereby enabling the femtocell base station to provide the location information to a core network for registration or to broadcast the location information within its coverage. The method comprises the steps of: (1) initiating a SUPL program of the femtocell base station to establish communication between the femtocell base station and the SUPL platform so as to obtain assistant positioning information and approximate location information through the SUPL platform and capturing related satellite signals according to the assistant positioning information; and (2) determining whether the captured related satellite signals are sufficient for positioning calculation, wherein, if they are, performing the positioning calculation according to the captured related satellite signals to obtain precise location information so as to enable the femtocell base station to provide the precise location information to the core network for registration or to broadcast the precise location information within its coverage, and, otherwise, i.e., if it is determined that the captured related satellite signals are not sufficient for positioning calculation, enabling the femtocell base station to provide the approximate location information to the core network for registration or broadcast the approximate location information within its coverage.

Therein, the network system supporting the SUPL platform can comprise: GNSS satellites, a world wide reference network (WWRN) and mobile communication network base stations; and the SUPL platform can have a SUPL positioning center, a SUPL location center and a location user interface for communication between the SUPL platform and the femtocell base station.

Therein, step (1) can further comprise the steps of: (1-1) the femtocell base station sending a positioning connection request message with a terminal identification to the SUPL platform through the network system supporting the SUPL platform and the location user interface; (1-2) after receiving the positioning connection request message, the SUPL platform activating the SUPL positioning center to verify the positioning permission of the femtocell base station so as to establish communication between the SUPL platform and the femtocell base station if it is determined that the femtocell base station has the positioning permission, thereby allowing the SUPL location center to send assistant positioning information and approximate location information to the femtocell base station; and (1-3) the femtocell base station capturing related satellite signals according to the assistant positioning signals so as to obtain related positioning information. The step (2) can further comprise the step of determining whether the related satellite signals are sufficient for positioning calculation according to the related positioning information.

In a preferred embodiment, the femtocell base station can perform the positioning calculation according to the related positioning information obtained from step (1-3) so as to obtain precise location information. Alternatively, the SUPL platform can perform the positioning calculation according to the related positioning information obtained from step (1-3) so as to obtain precise location information and send the precise location information to the femtocell base station.

The present invention further provides a system for positioning a femtocell base station through a SUPL platform, which comprises: a plurality of mobile communication network base stations; a SUPL platform having a SUPL location center for obtaining location information of the mobile communication network base stations and a SUPL positioning center for establishing communication (such as establishing a secure data connection with a SUPL user); a location user interface connected to the SUPL platform; and a femtocell base station having a SUPL program for communication with the SUPL platform, wherein when the SUPL program is initiated, communication can be established between the SUPL program and the femtocell base station through the location user interface such that the femtocell base station provides to the SUPL location center the location information of the mobile communication network base stations adjacent to the femtocell base station so as to obtain approximate location information of the femtocell base station and assistant positioning information from the SUPL location center, and, further, the femtocell base station utilizes the assistant positioning information to capture related satellite signals and determines whether the captured related satellite signals are sufficient for positioning calculation, wherein, if they are, the femtocell base station performs the positioning calculation according to the captured related satellite signals so as to obtain precise location information of the femtocell base station and use the precise location information as positioning information, and, otherwise, i.e., if the captured related satellite signals are not sufficient for positioning calculation, the femtocell base station uses the approximate location information as positioning information.

Therefore, the method and system of the present invention initiate a SUPL program of a femtocell base station to establish communication between the femtocell base station and a SUPL platform so as to obtain assistant positioning information and approximate location information from the SUPL platform and further capture related satellite signals according to the assistant positioning information for calculating precise location information of the femtocell base station. As such, the present invention overcomes the conventional problem that it takes a long time for a first time positioning of a femtocell base station to be established, and, more importantly, when the captured satellite signals are not sufficient for positioning calculation, the present invention allows the femtocell base station to obtain and provide the approximate location information to a core network for registration or to broadcast the approximate location information within its coverage, thereby overcoming the conventional problem that positioning cannot be performed due to insufficient (too few or too weak) satellite signals.

DETAILED DESCRIPTION OF PREFERRED EMBODIMENTS

The following illustrative embodiments are provided to illustrate the disclosure of the present invention and its advantages, these and other advantages and effects being apparent to those in the art after reading this specification. The present invention can also be performed or applied by other embodiments. Moreover, various modifications and variations based on different viewpoints and applications can be made in the details of the specification without departing from the spirit of the present invention.

The present invention provides a method for positioning a femtocell base station such as a femtocell base station through a SUPL (secure user plane location) platform and a network system supporting the SUPL platform so as to obtain location information of the femtocell base station, thereby enabling the femtocell base station to provide the location information to a core network for registration or to broadcast the location information within its coverage. The network system supporting the SUPL platform comprises GNSS satellites, a word wide reference network (WWRN) and mobile communication network base stations.

The GNSS satellites provide autonomous geo-spatial positioning for global coverage and send satellite signals to GNSS receivers. The WWRN comprises GNSS receivers and GNSS data servers for continuously collecting ephemeris or coordinates of the global satellites through the GNSS receivers and storing satellite data. The GNSS receivers can obtain their own location information containing the latitudinal, longitudinal and altitudinal coordinates within an error of only a few meters according to signals sent from the satellites. The mobile communication network base stations broadcast necessary information such as location information to mobile network users within its coverage. The SUPL platform is used for obtaining location information of the mobile communication network base stations, connecting with the WWRN for obtaining information of satellites above the mobile communication network base stations, and communicating with the femtocell base station to provide a positioning service.

Figure 1:
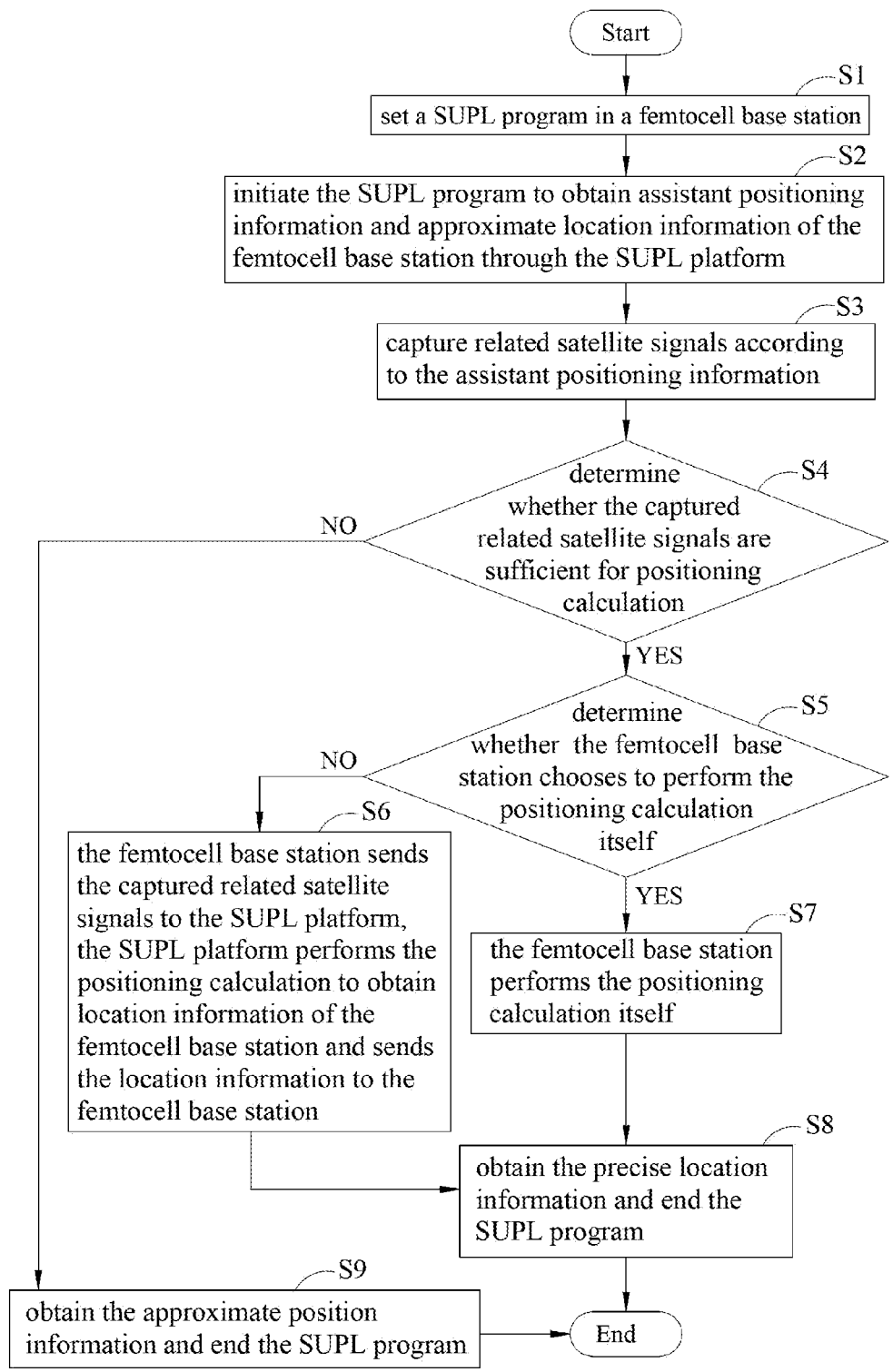
FIG. 1 is a flow diagram illustrating a method for positioning a femtocell base station through a SUPL platform according to the present invention.

FIG. 1 is a flow diagram illustrating a method for positioning a femtocell base station through a SUPL platform according to the present invention. Referring to FIG. 1, first, at step S1, a SUPL program is set in the femtocell base station. In a preferred embodiment, an A-GNSS chip is disposed in the femtocell base station for processing assistant positioning information provided by the SUPL platform and received satellite signals Then, the process goes to step S2.

At step S2, the femtocell base station initiates the SUPL program to obtain assistant positioning information and approximate location information of the femtocell base station through the SUPL platform. Then, the process goes to step S3. The assistant positioning information relates to positioning satellites most likely existing above the femtocell base station so as to facilitate the femtocell base station in search of satellite signals The approximate location information is obtained by calculating related information of mobile networks, which is an approximate geographical range of the position of the femtocell base station. In particular, since a plurality of mobile communication network base stations is disposed by mobile network operators in a plurality of predefined mobile communication ranges, respectively, the approximate location information of the femtocell base station can be calculated through an algorithm according to the location of the mobile communication network base stations adjacent to the femtocell base station and signal strength of the mobile communication network base stations. The approximate location information has an error between 10 m and 10 km, depending on the density of the mobile communication network base stations.

At step S3, the femtocell base station tries to capture related satellite signals from the most likely satellites above the femtocell base station according to the assistant positioning information. Then, the process goes to step S4.

At step S4, the femtocell base station ends the signal capturing process and determines whether the captured related satellite signals are sufficient for positioning calculation, wherein, if they are, the process goes to step S5; otherwise, the process goes to step S9. The condition for determining whether the captured related satellite signals are sufficient for a positioning calculation can be, for example, the content of the captured related satellite signals can be decoded by the femtocell base station and the decodable satellite signals are provided by at least three satellites.

At step S5, it is determined whether the femtocell base station chooses to perform the positioning calculation itself, wherein, if it does, the process goes to step S7; otherwise, the process goes to step S6.

At step S6, the femtocell base station sends the captured related satellite signals to the SUPL platform such that the SUPL platform performs the positioning calculation to obtain location information of the femtocell base station and send the location information to the femtocell base station. Then, the process goes to step S8.

At step S7, the femtocell base station performs the positioning calculation itself according to the captured related satellite signals to obtain its location information. Then, the process goes to step S8.

At step S8, the femtocell base station obtains the precise location information and ends the SUPL program. Then, the positioning process of the femtocell base station is ended.

At step S9, the femtocell base station obtains the approximate location information and ends the SUPL program. As such, the positioning process of the femtocell base station is ended.

In step S2, before obtaining the assistant positioning information and approximate location information, the femtocell base station sends a positioning connection request message with a terminal identification through a location user interface so as for the SUPL platform to verify the positioning permission of the femtocell base station. If the SUPL platform determines that the femtocell base station has the positioning permission, it allows the femtocell base station to communicate with the SUPL platform to obtain the assistant positioning information and approximate location information; otherwise, if the SUPL platform determines that the femtocell base station does not have the positioning permission, the SUPL platform rejects the positioning request and ends the positioning process of the femtocell base station. The terminal identification is information utilized for identification of the femtocell base station on the SUPL platform.

After steps S8 and S9, the femtocell base station can use the precise location information or approximate location information to register in a core network or to broadcast the location information to mobile network users within its coverage.

As described in steps S3 and S8, since the femtocell base station can conveniently capture related satellite signals according to the assistant positioning information, it speeds up the access of the precise location information, thereby overcoming the conventional problem that it takes a long time for a first time positioning of a femtocell base station to be established.

Figure 2:
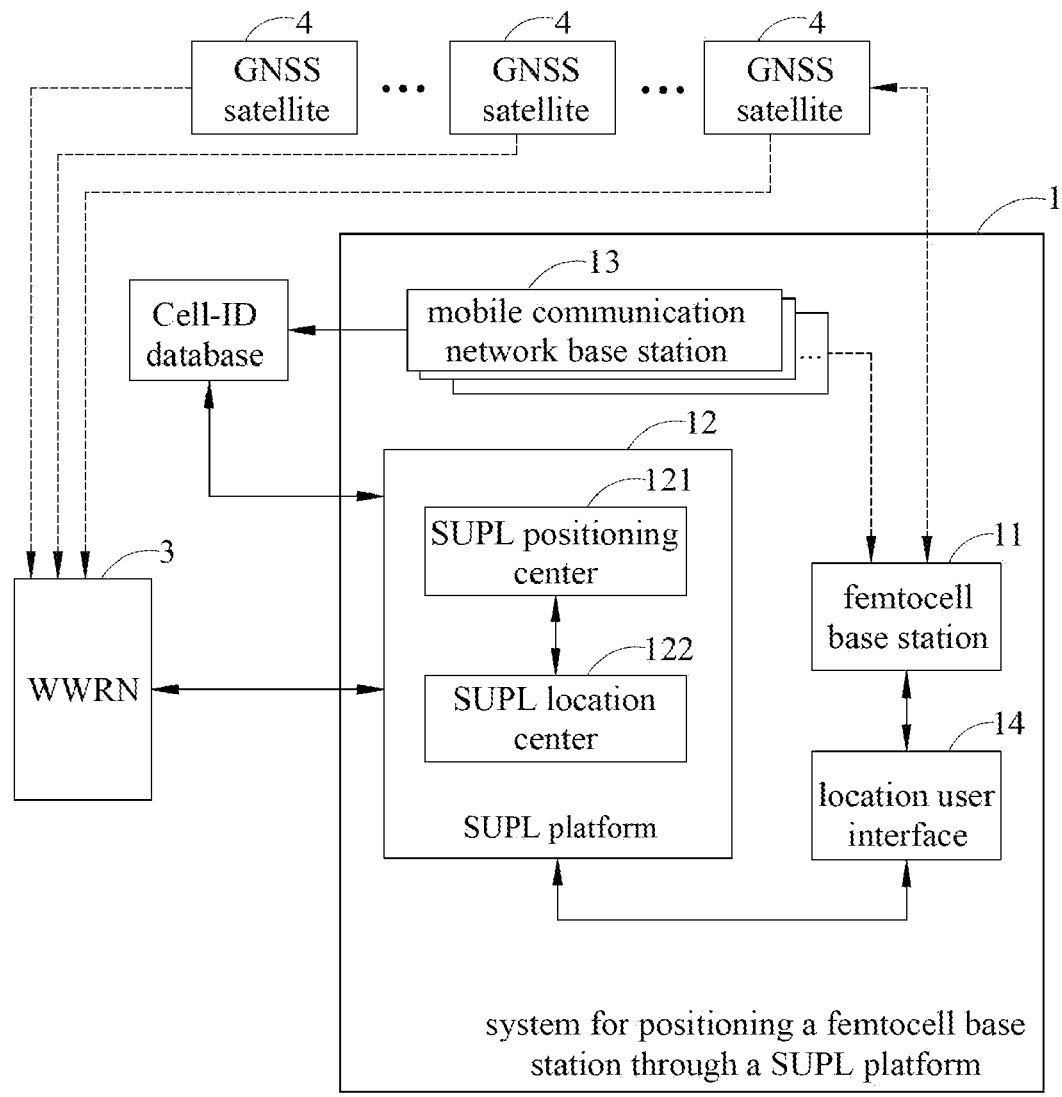
FIG. 2 is an architectural block diagram illustrating the basic architecture of a system for positioning a femtocell base station through a SUPL platform according to the present invention.

FIG. 2 is an architectural block diagram illustrating the basic architecture of a system for positioning a femtocell base station through a SUPL platform according to the present invention.

Referring to FIG. 2, the system 1 uses a SUPL platform for positioning a femtocell base station 11 so as to obtain location information of the femtocell base station 11, thereby enabling the femtocell base station 11 to provide the location information to a core network for registration or to broadcast the location information within its coverage. The system 1 comprises a plurality of mobile communication network base stations 13, a SUPL platform 12, a femtocell base station 11, and a location user interface 14 based on Internet connection and used for data exchange in a positioning process.

The SUPL platform 12 has a SUPL location center 122 for obtaining location information of the mobile communication network base stations 13 and a SUPL positioning center 121 for establishing a secure data connection.

The femtocell base station 11 has a SUPL program for establishing communication with the SUPL platform 12. When the SUPL program is initiated, a positioning connection request message is sent from the femtocell base station 11 to the SUPL platform 12 through the location user interface 14. In a preferred embodiment, the femtocell base station 11 has an A-GNSS chip disposed therein for processing assistant positioning information provided by the SUPL location center 122 of the SUPL platform 12 and received satellite signals. The positioning connection request message comprises a terminal identification for identification of the femtocell base station on the SUPL platform.

The SUPL location center 122 of the SUPL platform 12 is connected to a WWRN 3 to obtain ephemeris of GNSS satellites 4 from the WWRN 3 so as to provide assistant positioning information to the femtocell base station 11. Alternatively, a long term orbit prediction can be performed for each of the GNSS satellites 4 so as to provide real-time assistant positioning information to the femtocell base station 11. The SUPL positioning center 121 is used for verifying whether the femtocell base station 11 that sends the positioning connection request message has positioning permission. Since the WWRN is a well-known device in the current positioning technology, detailed description thereof is omitted herein.

After receiving the positioning connection request message, the SUPL platform 12 activates the SUPL positioning center 121 to verify the positioning permission of the femtocell base station 11. If the SUPL positioning center 121 determines that the femtocell base station does not have the positioning permission, the SUPL positioning center 121 does not perform a positioning process; otherwise, the SUPL positioning center 121 establishes communication between the femtocell base station 11 and the SUPL platform 12 such that the SUPL location center 122 obtains location information of the mobile communication network base stations 13 adjacent to the femtocell base station 11 so as to send assistant positioning information and approximate location information to the femtocell base station 11.

In a preferred embodiment, after receiving the assistant positioning information and approximate location information from the SUPL location center 122, the femtocell base station 11 begins to capture related signals of the GNSS satellites 4 located above the femtocell base station 11 according to the assistant positioning information so as to obtain related positioning information. If the captured related signals are not sufficient for positioning calculation, the femtocell base station 11 provides the approximate location information to the core network for registration or broadcasts the approximate location information within its coverage.

On the other hand, if the captured related signals of the GNSS satellites 4 are sufficient for positioning calculation, the femtocell base station 11 performs the positioning calculation according to the related positioning information so as to obtain precise location information and provide the precise location information to the core network for registration or to broadcast the precise location information within its coverage.

In addition, the femtocell base station 11 can send the related positioning information to the SUPL platform 12 so as to allow the SUPL platform 12 to perform the positioning calculation to obtain precise location information of the femtocell base station and further send the precise location information to the femtocell base station 11.

Therefore, the method and system of the present invention overcome the conventional problem that it takes a long time for a first time positioning of a femtocell base station to be established and, more importantly, the method and system of the present invention enables a femtocell base station to obtain and provide approximate location information to a core network for registration or to broadcast the approximate location information within its coverage when the captured satellite signals are not sufficient for positioning calculation, thereby overcoming the conventional problem that positioning cannot be performed due to insufficient satellite signals.

The above-described descriptions of the detailed embodiments are intended to illustrate the preferred implementation according to the present invention but are not intended to limit the scope of the present invention. Accordingly, many modifications and variations completed by those with ordinary skill in the art will fall within the scope of present invention defined by the appended claims.

What is claimed is:

1. A method for positioning a femtocell base station through a SUPL platform and a network system supporting the SUPL platform so as to obtain location information of the femtocell base station, thereby enabling the femtocell base station to provide the location information to a core network for registration or to broadcast the location information within its coverage, the method comprising the steps of:
   (1) initiating a SUPL program of the femtocell base station to establish communication between the femtocell base station and the SUPL platform so as to obtain assistant positioning information and approximate location information through the SUPL platform and capturing related satellite signals according to the assistant positioning information; and
   (2) determining whether the captured related satellite signals are sufficient for positioning calculation, wherein, if they are sufficient, performing the positioning calculation according to the captured related satellite signals to obtain precise location information so as to enable the femtocell base station to provide the precise location information to the core network for registration or to broadcast the precise location information within its coverage; otherwise, if it is determined that the captured related satellite signals are not sufficient for positioning calculation, enabling the femtocell base station to provide the approximate location information to the core network for registration or to broadcast the approximate location information within its coverage area.

2. The method of claim 1, further comprising the step of presetting the SUPL program in the femtocell base station.

3. The method of claim 1, wherein the network system supporting the SUPL platform comprises: GNSS satellites, a world wide reference network (WWRN) and mobile communication network base stations, and the SUPL platform has a SUPL positioning center, a SUPL location center and a location user interface for communication between the SUPL platform and the femtocell base station.

4. The method of claim 3, wherein step (1) further comprises the steps of:
   (1-1) sending by the femtocell base station a positioning connection request message with a terminal identification through the network system supporting the SUPL platform and the location user interface to the SUPL platform;
   (1-2) after receiving the positioning connection request message, activating by the SUPL platform the SUPL positioning center to verify positioning permission of the femtocell base station so as to establish communication between the SUPL platform and the femtocell base station if it is determined that the femtocell base station has the positioning permission, thereby allowing the SUPL location center to send the assistant positioning information and approximate location information to the femtocell base station; and
   (1-3) capturing by the femtocell base station the related satellite signals according to the assistant positioning signals so as to obtain related positioning information.

5. The method of claim 4, wherein step (2) further comprises the step of determining whether the related satellite signals are sufficient for the positioning calculation according to the related positioning information.

6. The method of claim 5, wherein the femtocell base station determines whether the related satellite signals are sufficient for the positioning calculation according to the related positioning information, such that if it is determined that the related satellite signals are sufficient for the positioning calculation, the femtocell base station performs the positioning calculation according to the related satellite signals so as to obtain precise location information.

7. The method of claim 5, wherein the SUPL platform determines whether the related satellite signals are sufficient for the positioning calculation according to the related positioning information, such that if it is determined that the related satellite signals are sufficient for the positioning calculation, the SUPL platform performs the positioning calculation according to the related satellite signals so as to obtain precise location information and send the precise location information to the femtocell base station.

8. The method of claim 4, wherein the terminal identification is information utilized for identification of the femtocell base station on the SUPL platform.

9. A system for positioning a femtocell base station through a SUPL platform, comprising:
   a plurality of mobile communication network base stations;
   a SUPL platform having a SUPL location center for obtaining location information of the mobile communication network base stations and a SUPL positioning center for establishing communication;
   a location user interface connected to the SUPL platform; and
   a femtocell base station having a SUPL program for communication with the SUPL platform, wherein when the SUPL program is initiated, communication is established between the SUPL program and the femtocell base station through the location user interface such that the femtocell base station provides to the SUPL location center the location information of the mobile communication network base stations adjacent to the femtocell base station so as to obtain approximate location information and assistant positioning information of the femtocell base station from the SUPL location center, and, further, the femtocell base station utilizes the assistant positioning information to capture related satellite signals and determines whether the captured related satellite signals are sufficient for positioning calculation, wherein, if they are sufficient, the femtocell base station performs the positioning calculation according to the captured related satellite signals so as to obtain precise location information of the femtocell base station and use the precise location information as positioning information; otherwise, if the captured related satellite signals are not sufficient for the positioning calculation, the femtocell base station uses the approximate location information as positioning information.

10. A system for positioning a femtocell base station through a SUPL platform, comprising:
   a plurality of mobile communication network base stations;
   a SUPL platform having a SUPL location center for obtaining location information of the mobile communication network base stations and a SUPL positioning center for establishing communication;
   a location user interface connected to the SUPL platform; and
   a femtocell base station having a SUPL program for communication with the SUPL platform, wherein, when the SUPL program is initiated, communication can be established between the SUPL program and the femtocell base station through the location user interface such that the femtocell base station provides to the SUPL location center the location information of the mobile communication network base stations adjacent to the femtocell base station so as to obtain approximate location information and assistant positioning information of the femtocell base station from the SUPL location center, and, further, the femtocell base station utilizes the assistant positioning information to capture related satellite signals and determines whether the captured related satellite signals are sufficient for positioning calculation, wherein, if they are sufficient, the femtocell base station sends the related satellite signals to the SUPL platform such that the SUPL platform performs the positioning calculation according to the related satellite signals so as to obtain precise location information of the femtocell base station and send the precise location information as positioning information to the femtocell base station; otherwise, if the captured related satellite signals are not sufficient for positioning calculation, the femtocell base station uses the approximate location information as positioning information.

* * * * *